US011590917B2

(12) United States Patent
Ohno et al.

(10) Patent No.: US 11,590,917 B2
(45) Date of Patent: Feb. 28, 2023

(54) REAR SEAT AIRBAG MODULE AND VEHICLE SEAT

(71) Applicants: Toyota Jidosha Kabushiki Kaisha, Toyota (JP); Toyoda Gosei Co., Ltd., Kiyosu (JP)

(72) Inventors: Mitsuyoshi Ohno, Miyoshi (JP); Masashi Hotta, Kiyosu (JP); Hiroyuki Tomita, Kariya (JP)

(73) Assignees: TOYOTA JIDOSHA KABUSHIKI KAISHA, Toyota (JP); TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 17/403,005

(22) Filed: Aug. 16, 2021

(65) Prior Publication Data

US 2022/0073026 A1 Mar. 10, 2022

(30) Foreign Application Priority Data

Sep. 9, 2020 (JP) .............................. JP2020-151657

(51) Int. Cl.
*B60R 21/207* (2006.01)
*B60R 21/217* (2011.01)
(Continued)

(52) U.S. Cl.
CPC ........ *B60R 21/207* (2013.01); *B60R 21/0132* (2013.01); *B60R 21/217* (2013.01); *B60R 21/231* (2013.01); *B60R 2021/0011* (2013.01); *B60R 2021/0032* (2013.01); *B60R 2021/01013* (2013.01); *B60R 2021/2173* (2013.01); *B60R 2021/2175* (2013.01); *B60R 2021/23153* (2013.01)

(58) Field of Classification Search
CPC . B60R 21/207; B60R 21/0132; B60R 21/231; B60R 21/201; B60R 21/217; B60R 2021/0011; B60R 2021/0032; B60R 2021/23153; B60R 2021/2173; B60R 2021/2175
USPC ........................................... 280/730.1, 728.2
See application file for complete search history.

(56) References Cited

U.S. PATENT DOCUMENTS 5,782,529 A * 7/1998 Miller, III ............. B60R 21/207
297/216.12
9,573,554 B2 * 2/2017 Nagasawa ............ B60N 2/7094
(Continued)

FOREIGN PATENT DOCUMENTS

DE 10104456 A1 * 9/2002 ............. B60R 21/20
DE 10201836 A1 * 8/2003 ........... B60R 21/207
(Continued)

*Primary Examiner* — Keith J Frisby
(74) *Attorney, Agent, or Firm* — Dinsmore & Shohl LLP

(57) ABSTRACT

A rear seat airbag module includes: an airbag; and an inflator configured to supply gas for expansion and deployment into the airbag. The rear seat airbag module is attached to a frame of a seat back of a vehicle seat, and is configured to expand and deploy the airbag to a seat rear side of the seat back. The rear seat airbag module is displaceable to the seat rear side or deformable to the seat rear side due to an easily deformable configuration, by being pressed by a back of an occupant seated on the vehicle seat, as a result of the back being sunk in the seat back due to an impact of a rear collision of a vehicle.

15 Claims, 15 Drawing Sheets

(51) Int. Cl.
*B60R 21/0132* (2006.01)
*B60R 21/231* (2011.01)
B60R 21/00 (2006.01)
B60R 21/01 (2006.01)

(56) References Cited

U.S. PATENT DOCUMENTS

| | | | |
|---|---|---|---|
| 2002/0036398 A1* | 3/2002 | Wohllebe | B60R 21/207 |
| | | | 280/728.2 |
| 2006/0091651 A1 | 5/2006 | Suzuki et al. | |
| 2010/0052295 A1 | 3/2010 | Fukawatase et al. | |
| 2019/0047503 A1* | 2/2019 | Faruque | B60N 2/22 |
| 2020/0139916 A1* | 5/2020 | Nagai | B60R 21/207 |

FOREIGN PATENT DOCUMENTS

| | | |
|---|---|---|
| JP | 2006-123628 A | 5/2006 |
| JP | 2008-114609 A | 5/2008 |
| JP | 2009-126469 A | 6/2009 |
| JP | 2019-031151 A | 2/2019 |
| JP | 2019-031166 A | 2/2019 |

* cited by examiner

REAR SEAT AIRBAG MODULE AND VEHICLE SEAT

CROSS-REFERENCE TO RELATED APPLICATION

This application claims priority to Japanese Patent Application No. 2020-151657 filed on Sep. 9, 2020, incorporated herein by reference in its entirety.

BACKGROUND

1. Technical Field

The present disclosure relates to a rear seat airbag module and a vehicle seat in which the rear seat airbag module is attached to a seat back frame.

2. Description of Related Art

In a vehicle seat described in Japanese Unexamined Patent Application Publication No. 2019-031151 (JP 2019-031151 A), a rear seat airbag module mounted on an upper half portion of a frame of a seat back expands and deploys an airbag rearward in the event of a frontal collision of the vehicle. This airbag protects occupants in the rear seats. This vehicle seat suppresses the back of the occupant from feeling a foreign body sensation from the rear seat airbag module when the occupant is seated normally.

SUMMARY

By the way, in order to improve the performance of preventing whiplash of an occupant's neck at the event of a rear collision of a vehicle, it is necessary to allow the occupant's back to sink in a seat back due to the impact of the rear collision and appropriately support the occupant's head with the headrest. In this regard, in the configuration in which a rear seat airbag module is mounted in the seat back as in the above-mentioned prior art, it is required that in the event of a rear collision, the back of the occupant is not hindered from sinking in the seat back by the interference with the rear seat airbag module. Thus, when the rear seat airbag module is disposed away from the above-mentioned occupant to the seat rear side, the seat back becomes thicker in the front-rear direction of the seat. As a result, for example, the living space for the rear seat occupants becomes smaller.

The present disclosure provides: a rear seat airbag module in which it is easy to secure a performance of preventing whiplash of an occupant's neck and to reduce a thickness of the seat back; and a vehicle seat provided with the rear seat airbag module.

The rear seat airbag module according to a first aspect of the present disclosure includes an airbag and an inflator configured to supply gas for expansion and deployment into the airbag. The rear seat airbag module is attached to a frame of a seat back of a vehicle seat, and is configured to expand and deploy the airbag toward a seat rear side of the seat back. The rear seat airbag module is displaceable to the seat rear side or deformable due to an easily deformable configuration, by being pressed by a back of an occupant seated on the vehicle seat, as a result of the back being sunk in the seat back due to an impact of a rear collision of a vehicle.

In addition, the term "sink in" described in the first aspect is synonymous with "cave in". Further, in the first aspect, the term "displaced to the seat rear side" is not limited to the case in which the entire rear seat airbag module is displaced to the seat rear side, and also includes a case in which only a part of the rear seat airbag module (for example, only a part of the air bag case) is displaced to the seat rear side.

In the first aspect, the rear seat airbag module attached to the frame of the seat back of the vehicle seat has the airbag and the inflator that supplies gas for expansion and deployment into the airbag. The rear seat airbag module expands and deploys the airbag to the seat rear side of the above-mentioned seat back at the time of the frontal collision of the vehicle, for example. As a result, the occupant in the rear seat of the vehicle seat can be protected by the airbag. Further, the rear seat airbag module is displaced to the seat rear side or is deformed to the seat rear side due to an easily deformable configuration, by being pressed by the back of the occupant (hereinafter, may be referred to as a "front seat occupant") seated on the vehicle seat, as a result of the back being sunk in the seat back due to an impact of a rear collision of a vehicle. As a result, since the above-mentioned sink-in can be suppressed from being hindered by interference with the present rear seat airbag module, it is possible to ensure a performance of preventing whiplash of the neck of the front seat occupant. Moreover, it is not necessary to arrange the present rear seat airbag module away from the front seat occupant to the seat rear side in order to allow the above-mentioned sink-in. As a result, the seat back can be made thinner in the front-rear direction while the above-mentioned whiplash prevention performance is ensured.

In the first aspect, the rear seat airbag module may include a module case that stores the airbag and that is attached to the frame. The easily deformable configuration may be provided so that the module case is pressed and deformed by the back.

According to the above configuration, when the back of the front seat occupant sinks in the seat back due to the impact of the rear collision of the vehicle, the module case that stores the airbag and that has an easily deformable configuration is pressed by the back and is deformed to the seat rear side. As a result, it is possible to allow the back to sink into the seat back. Moreover, since the airbag is stored in the module case, the deploying reaction force of the airbag can be satisfactorily received by the module case, for example.

In the above aspect, the module case may be made of cloth. A part of the module case on the seat rear side is fixed to the frame on both sides in a seat up-down direction.

According to the above configuration, the module case made of cloth has an easily deformable configuration. A part of the cloth module case on the seat rear side is fixed to the frame on both sides in a seat up-down direction. As a result, in the event of a rear collision of the vehicle, the cloth module case is pressed by the back of the front seat occupant and is deformed to the seat rear side. In contrast, when the airbag is expanded and deployed, the cloth module case receives the deploying reaction force of the airbag while receiving a tensile force. By having the module case be made of cloth in this way, it is possible to reduce the weight of the module case as compared with the case in which the module case is made of metal, for example.

In the above aspect, a pair of upper and lower flange portions extended to both sides in the seat up-down direction may be formed at a rear end portion of the module case. The pair of flange portions may be sandwiched by a pair of front-rear retainers from both sides in a seat front-rear direction. The module case may be fixed to the frame using the pair of retainers.

According to the above configuration, the pair of upper and lower flange portions formed at the rear end portion of the cloth module case is sandwiched by a pair of front-rear retainers from both sides in the seat front-rear direction. Then, using the pair of retainers, the cloth module case is fixed to the frame of the seat back. As a result, the cloth module case can be easily and firmly fixed to the frame of the seat back.

In the above aspect, the module case may have a plurality of strip-shaped members, each of the strip-shaped members being made of cloth. The plurality of strip-shaped members may be disposed alongside each other in the seat right-left direction, both end portions of each strip-shaped member in the seat up-down direction may be fixed to the frame, and an intermediate portion of each strip-shaped member in the seat up-down direction may be loosened toward a seat front side. The airbag may be stored on the seat rear side with respect to the intermediate portion of the plurality of strip-shaped members in the seat up-down direction.

According to the above configuration, a plurality of strip-shaped members, each of which is made of cloth, has an easily deformable configuration. These strip-shaped members are disposed alongside each other in the seat right-left direction, and both end portions of each strip-shaped member in the seat up-down direction are fixed to the frame. The intermediate portion of each strip-shaped member in the seat up-down direction is in a state of being loosened toward the seat front side. Then, the airbag is stored on the seat rear side with respect to the intermediate portion of the plurality of strip-shaped members in the seat up-down direction (that is, the portion loosened toward the seat front side). In this aspect, at an event of a rear collision of the vehicle, the plurality of strip-shaped members is pressed by the back of the front seat occupant and is deformed to the seat rear side. In contrast, when the airbag is expanded and deployed, the plurality of strip-shaped members receives the deploying reaction force of the airbag while receiving a tensile force. As described above, by using the plurality of strip-shaped members, the configuration of the module case can be simplified and the weight can be further reduced.

In the above aspect, the module case may have a fragile portion that is plastically deformed by being pressed by the back.

According to the above configuration, the fragile portion provided in the module case has an easily deformable configuration. In this aspect, when the back of the front seat occupant sinks in the seat back due to the impact of the rear collision of the vehicle, the fragile portion provided in the module case is plastically deformed due to the module case being pressed by the back. As a result, the module case is deformed to the seat rear side. In this way, since the configuration is such that the module case is provided with the fragile portion, for example, a conventional metal module case can be diverted without significantly changing the structure.

In the above aspect, the fragile portion may be configured by having a plurality of holes formed in a peripheral wall of the module case.

According to the above configuration, since the fragile portion is provided in the module case by forming a plurality of holes in the peripheral wall of the module case, the fragile portion can be simplified.

In the first aspect, the module case for storing the airbag may be provided. The module case may be attached to the frame so as to be displaceable to the seat rear side by being pressed by the back.

According to the above configuration, when the back of the front seat occupant sinks in the seat back due to the impact of the rear collision of the vehicle, the module case that is attached to the frame of the seat back is pressed by the back and is deformed to the seat rear side. In this way, since the configuration is such that the module case is attached to the frame of the seat back so as to be displaceable, the disclosure can be configured by using a conventional metal module case, for example.

In the above aspect, an urging member that urges the module case that is displaced to the seat rear side with respect to the frame to a seat front side may be provided.

According to the above configuration, the module case that is displaced to the seat rear side with respect to the frame of the seat back by being pressed by the back of the occupant is urged to the seat front side by the urging member. As a result, since the module case can be returned to the original position, repairs for returning the module case to the original position are not required.

In the above aspect, the module case may be attached to the frame so as to be slidable to the seat rear side.

According to the above configuration, when the back of the front seat occupant sinks in the seat back due to the impact of the rear collision of the vehicle, the module case attached to the frame of the seat back is pressed by the back and slides to the seat rear side. As a result, the above-mentioned sink-in can be allowed while the posture of the module case with respect to the above-mentioned frame is maintained.

In the above aspect, the module case may be attached to the frame so as to be rotatable and movable to the seat rear side.

According to the above configuration, when the back of the front seat occupant sinks in the seat back due to the impact of the rear collision of the vehicle, the module case that is attached to the frame of the seat back is pressed by the back and is rotated and moved to the seat rear side. In the case of such a rotation moving type, the mounting structure of the module case to the frame can be simplified as compared with the slide type described above.

In the above first aspect, while the airbag may be disposed at a position at which the airbag is pressed by the back during the rear collision, the inflator may be disposed at a position at which the inflator is not pressed by the back during the rear collision and the inflator is fixed to the frame.

According to the above configuration, when the back of the front seat occupant sinks in the seat back due to the impact of the rear collision of the vehicle, among the airbag and the inflator, only the airbag is pressed by the back described above and is displaced to the seat rear side. The inflator is disposed at a position at which the inflator is not pressed by the back, that is, a position at which the inflator does not hinder the sink-in of the back into the seat back, and is fixed to the frame of the seat back. As a result, the above-mentioned sink-in can be allowed with an extremely simple configuration.

In the above aspect, the frame may have an upper frame portion extended in a seat right-left direction at an upper end portion in the seat back. The inflator may be disposed on the seat rear side of the upper frame portion. The airbag may be disposed so as to be extended from the inflator to a seat lower side.

According to the above configuration, the frame of the seat back has the upper frame portion extended in the seat right-left direction at the upper end portion in the seat back. An inflator is disposed on the seat rear side of the upper frame portion. Then, the airbag extended from the inflator to the seat lower side is pressed by the back of the front seat occupant at the event of a rear collision of the vehicle and is displaced to the seat rear side. As described above, since the inflator is disposed on the seat rear side of the upper frame portion of the seat back frame, it is easy to secure the arrangement space of the inflator.

In the above aspect, a recess portion that is recessed to a seat front side may be formed on a surface on the seat rear side of the upper frame portion. At least a part of the inflator may be disposed in the recess portion.

According to the above configuration, at least a part of the inflator is disposed in the recess portion formed on the surface on the seat rear side of the upper frame portion of the frame of the seat back. As a result, the protruding amount of the inflator to the seat rear side of the upper frame portion can be reduced, which further contributes to reducing the size of the seat back in the seat front-rear direction.

The vehicle seat of a second aspect of the present disclosure includes a seat cushion, a seat back, and a rear seat airbag module that is according to the above aspect that is attached to the frame of the seat back.

According to the second aspect, the vehicle seat has a seat cushion and a seat back. A rear seat airbag module is attached to the frame of the seat back. Since this rear seat airbag module is the one described in the above aspect, the above-mentioned operations and effects can be obtained.

According to each aspect of the present disclosure, in the rear seat airbag module and the vehicle seat according to the present disclosure, it is easy to ensure a performance of preventing whiplash of the occupant's neck while reducing the thickness of the seat back.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a front seat 10 serving as a vehicle seat according to a first embodiment of the present disclosure will be described with reference to FIGS. 1 to 3. In each drawing, some reference signs and some members may be omitted in order to make the drawings easier to see. Further, an arrow FR, an arrow UP, and an arrow RH appropriately indicated in each figure indicate the front side, the upper side, and the right side of the vehicle on which the front seat 10 is mounted. Hereinafter, when the description is made simply using terms indicating directions i.e., forward and rearward, right and left, and upward and downward, these mean forward and rearward in the vehicle front-rear direction, right and left in the vehicle right-left direction (vehicle width direction), and upward and downward in the vehicle up-down direction unless otherwise specified.

Configuration

Figure 1:
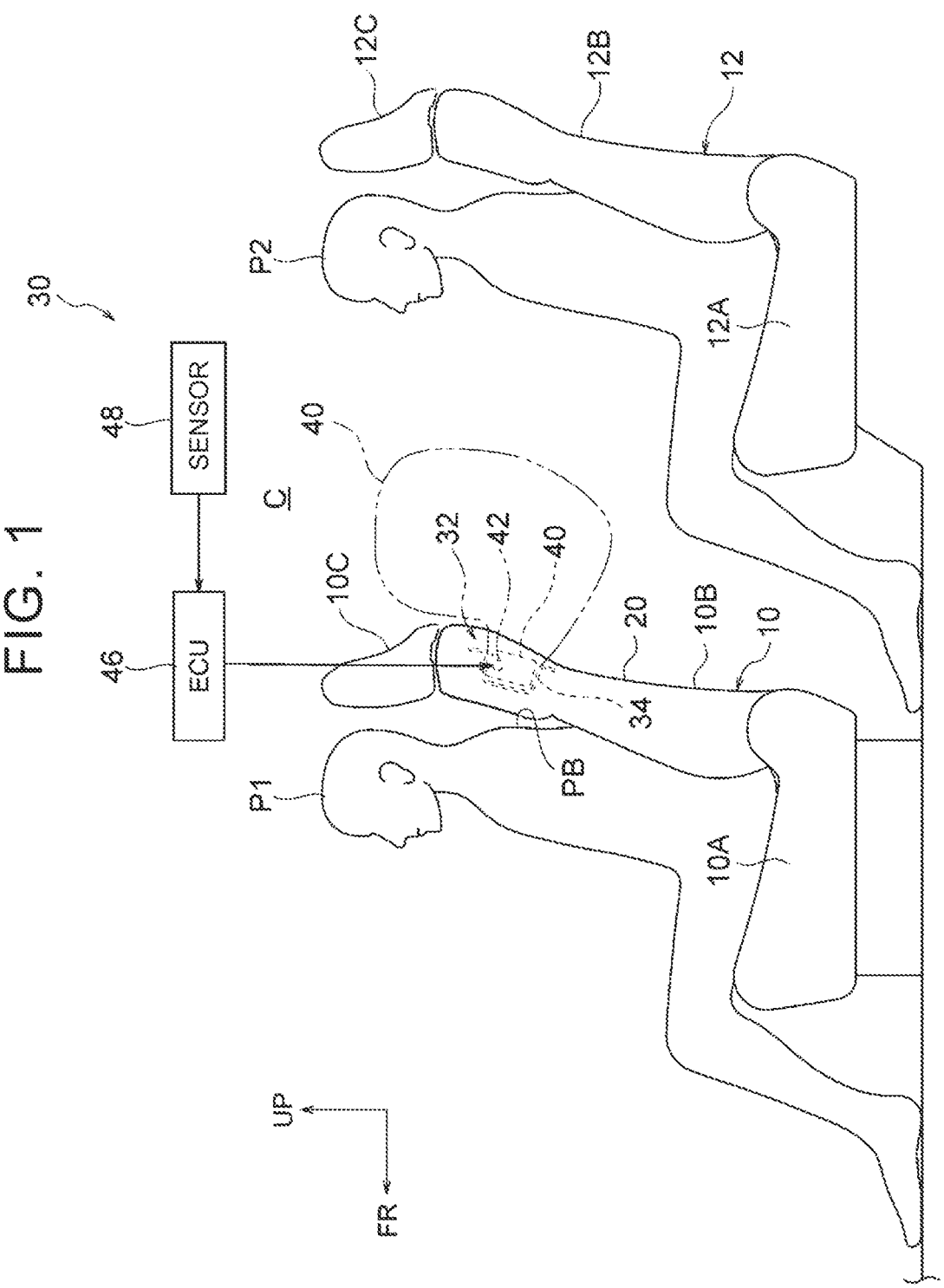
FIG. 1 is a side view showing the inside of a vehicle cabin of a vehicle on which a vehicle seat according to a first embodiment is mounted, as viewed from a left side of the vehicle.
Figure 2:
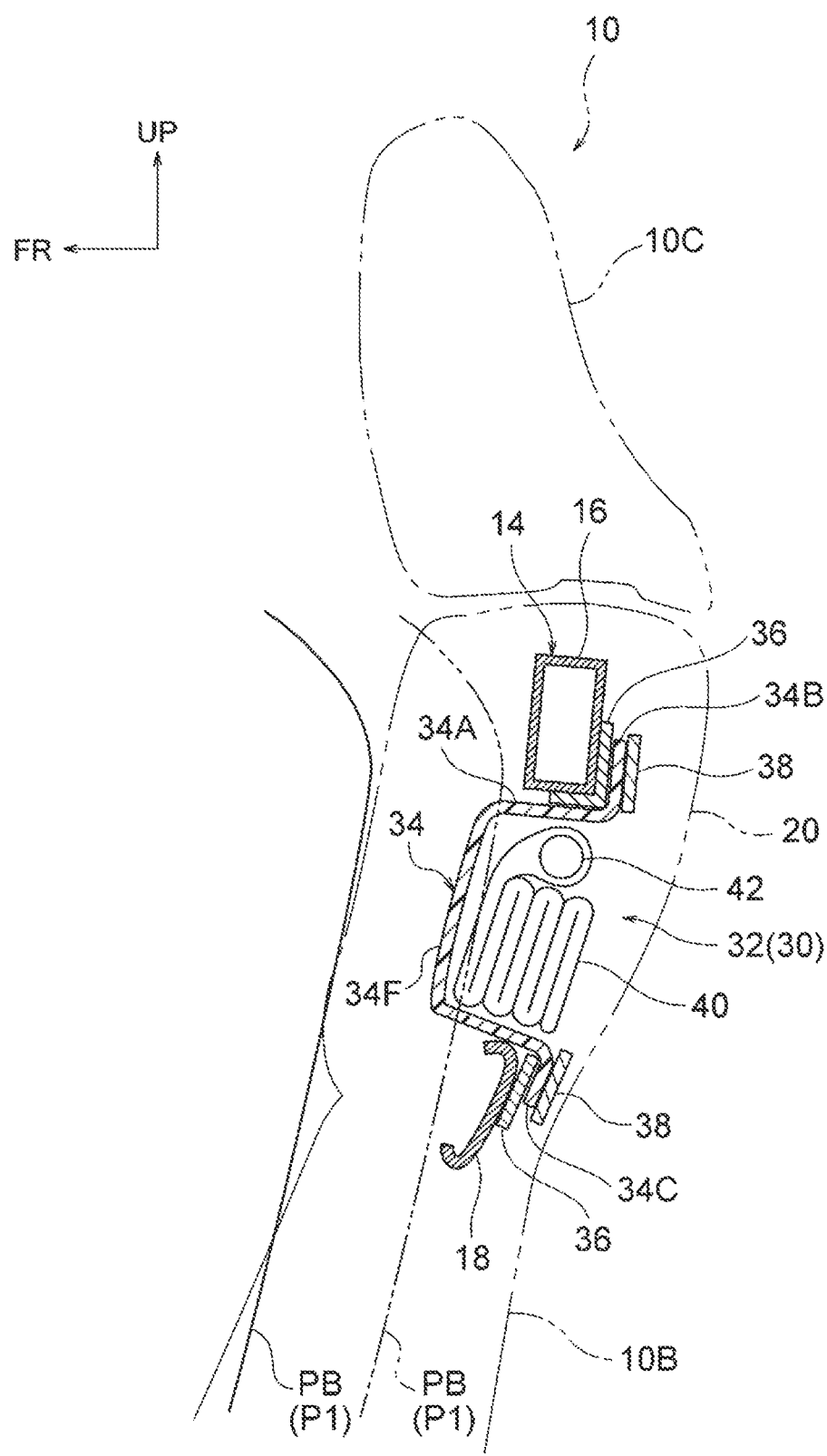
FIG. 2 is a cross-sectional view showing a configuration around a rear seat airbag module in the vehicle seat according to the first embodiment, as viewed from the left side of the vehicle.

FIG. 1 is a side view showing the inside of a vehicle cabin C of the vehicle on which the front seat 10 according to the present embodiment is mounted. This vehicle is, for example, a sedan type automobile, and a rear seat 12 is disposed behind the front seat 10. The front-rear, right-left, up-down directions of the front seat 10 and the rear seat 12 coincide with the front-rear, right-left, and up-down directions of the vehicle. The front seat 10 and the rear seat 12 have seat cushions 10A and 12A, seat backs 10B and 12B, and headrests 10C and 12C, respectively. Further, each of the front seat 10 and the rear seat 12 is provided with a seatbelt device (not shown) for restraining an occupant. Each seatbelt device is, for example, a so-called three-point seatbelt device.

In the present embodiment, although the present disclosure is applied to the front seat 10 of the vehicle, the present disclosure is not limited to this. The vehicle seat according to the present disclosure may be configured to be a seat in the second or subsequent rows of the vehicle. However, even in that case, another vehicle seat is disposed behind the vehicle seat according to the present disclosure. Further, in FIG. 1, occupants P1 and P2 seated on the front seat 10 and the rear seat 12 are, for example, AM50 (50 percentile of an American adult male) dummy doll. Hereinafter, the occupant P1 seated on the front seat 10 will be referred to as a "front seat occupant P1", and the occupant P2 seated on the rear seat 12 will be referred to as a "rear seat occupant P2".

A rear seat airbag module 32 is mounted on an upper portion of the seat back 10B of the front seat 10. The rear seat airbag module 32 configures a main part of the rear seat airbag device 30 that protects (restrains) the rear seat occupant P2 in the event of a frontal collision of the vehicle. The rear seat airbag module 32 is attached to the upper portion of a frame 14 of the seat back 10B as shown in FIG. 2.

The frame 14 has a pair of right and left side frame portions (not shown), an upper frame portion 16, and an intermediate frame portion 18. The right and left side frame portions extend in the up-down direction of the seat back 10B within the right and left side portions of the seat back 10B, and each lower end portion is coupled to the frame of the seat cushion 10A. The upper frame portion 16 is bridged between the upper end portions of the right and left side frame portions and extends in the right-left direction. The intermediate frame portion 18 is disposed on the lower side of the seat back 10B with respect to the upper frame portion 16, is bridged between the upper portions of the right and left side frame portions, and extends in the right-left direction.

The right and left side frame portions, the upper frame portion 16, and the intermediate frame portion 18 are made of sheet metal, for example. As an example, the right and left side frame portions have an open cross-sectional shape in which the inside in the right-left direction is open when viewed in the up-down direction. As an example, the upper frame portion 16 has a rectangular closed cross-sectional shape when viewed in the right-left direction. As an example, the intermediate frame portion 18 has an open cross-sectional shape in which the front side is open when viewed in the right-left direction. The frame 14 having the above configuration is covered with a back pad (not shown) configuring a cushion material of the seat back 10B. This back pad is covered by skin 20 of the seat back 10B.

The rear seat airbag module 32 attached to the upper portion of the frame 14 includes a module case 34, an airbag 40 stored in the module case 34, and an inflator 42. The module case 34 is disposed between the upper frame portion 16 and the intermediate frame portion 18, and has a box shape in which the rear side is open. For example, in the airbag 40, a plurality of base cloths are sewn to form a bag shape, and the airbag 40 is stored in the module case 34 in a state of being folded in a predetermined folding method. The inflator 42 is a columnar cylinder type, and is stored in the airbag 40 in a state in which the axial direction is along the right-left direction, for example. The inflator 42 may be a disk-shaped disc type.

As an example, the inflator 42 is disposed in the module case 34 on the upper side of the airbag 40 and on the opening side (rear end side) of the module case 34. A pair of stud bolts (not shown) protruding upward of the seat is provided on the outer peripheral portion of the inflator 42, in which the stud bolts are arranged side by side in the right-left direction, for example. For example, these stud bolts are extended through an upper wall of the module case 34 and a metal reinforcing plate provided on the upper surface of the upper wall, and are screwed to nuts (not shown). As a result, the inflator 42 is fixed to the module case 34.

As shown in FIG. 1, an airbag ECU (Electronic Control Unit) 46 mounted on the vehicle is electrically connected to the inflator 42. The airbag ECU 46 is a control device that controls the operation of the inflator 42, and is disposed below a center console (not shown) of the vehicle, for example. A collision sensor 48 mounted on the vehicle is electrically connected to the airbag ECU 46. The collision sensor 48 is an acceleration sensor for example, and is mounted on a front end portion of the vehicle. The collision sensor 48 is configured to detect a frontal collision based on an acceleration generated in the vehicle. Instead of the collision sensor 48, a collision prediction sensor (for example, an external camera, a radar, etc.) that predicts a frontal collision of the vehicle may be electrically connected to the airbag ECU 46.

When the airbag ECU 46 described above detects a frontal collision of the vehicle based on an electric signal output from the collision sensor 48, the airbag ECU 46 outputs an operation signal to the inflator 42. As a result, when the inflator 42 is operated, the airbag 40 begins to be expanded and deployed due to the pressure of the expansion and deployment gas generated from the inflator 42. At this time, the airbag 40 is expanded to the rear side while receiving a reaction force from the front side by the module case 34. As a result, a planned rupture portion provided on a skin 20 of the seat back 10B on the rear side of the module case 34 is ruptured by receiving the expansion pressure of the airbag 40. Due to this rupture, an opening is formed on a back surface of the skin 20, and the airbag 40 is expanded and deployed rearward from the opening. In FIG. 1, the expanded and deployed airbag 40 is shown by a long dashed double short dashed line. The expanded and deployed airbag 40 is disposed in front of an upper body of the rear seat occupant P2. As a result, the upper body of the rear seat occupant P2, which inertially moves forward due to the impact of the frontal collision, is protected (restrained) by the airbag 40.

Main Portion of Present Embodiment

Next, a main portion of the embodiment will be described. In the rear seat airbag module 32 having the above configuration, the module case 34 is made of easily deformable cloth. This module case 34 corresponds to an "easily deformable configuration" in the present disclosure. The cloth material configuring the module case 34 is a woven fabric of chemical fibers, which has pliability and flexibility and is set to have high tensile strength, for example. In this module case 34, the above-mentioned cloth material is sewn in a box shape. The module case 34 includes a box-shaped case main body portion 34A in which the rear side is open, an upper flange portion 34B extended from an upper edge portion of the rear end portion of the case main body portion 34A to the seat upper side, and a lower flange portion 34C extended from a lower edge portion of the rear end portion of the case main body portion 34A to the seat lower side. The module case 34 has a cross-sectional shape seen in the right-left direction, which is a hat shape in which the rear side is open. The "cloth" in the present embodiment is not limited to a woven fabric, and may be a resin sheet.

The case main body portion 34A is disposed between the upper frame portion 16 and the intermediate frame portion 18. The upper flange portion 34B is disposed behind the upper frame portion 16, and the lower flange portion 34C is disposed behind the intermediate frame portion 18. These flange portions 34B, 34C are each sandwiched by a pair of front-rear retainers 36 and 38 from both sides in the front-rear direction. These retainers 36 and 38 are configured of a metal plate for example, and have a frame shape when viewed in the front-rear direction. Then, a plurality of bolts (not shown) extended through the flange portions 34B and 34C together with the front-rear retainers 36 and 38 are screwed into a plurality of weld nuts (not shown) fixed to the upper frame portion 16 and the intermediate frame portion 18. As a result, the upper and lower flange portions 34B and 34C are fixed to the upper frame portion 16 and the intermediate frame portion 18. A part of the module case 34 on the rear side is fixed to the frame 14 on both sides in the up-down direction.

A front portion 34F of the case main body portion 34A disposed between the upper frame portion 16 and the intermediate frame portion 18 is disposed so as to protrude to the front side more than the upper frame portion 16 and the intermediate frame portion 18. The area in which the front portion 34F of the case main body portion 34A is disposed is a back sink-in region in which the back PB of the front seat occupant P1 sinks in (caves in) at the event of a rear collision of the vehicle. This back sink-in region is defined as an area in which the back of a dummy doll sinks in the seat back, in a rear collision neck protection performance test defined by JNCAP (Japan New Car Assessment Program), for example. In this rear collision neck protection performance test, the impact when a vehicle having the same mass as a stopped vehicle collides with the stopped vehicle at a speed of about 36.4 km/h (impact of speed change of 20.0 km/h) is reproduced. Further, in this rear collision neck protection performance test, a dummy doll called "BioRID II" is used.

Figure 3:
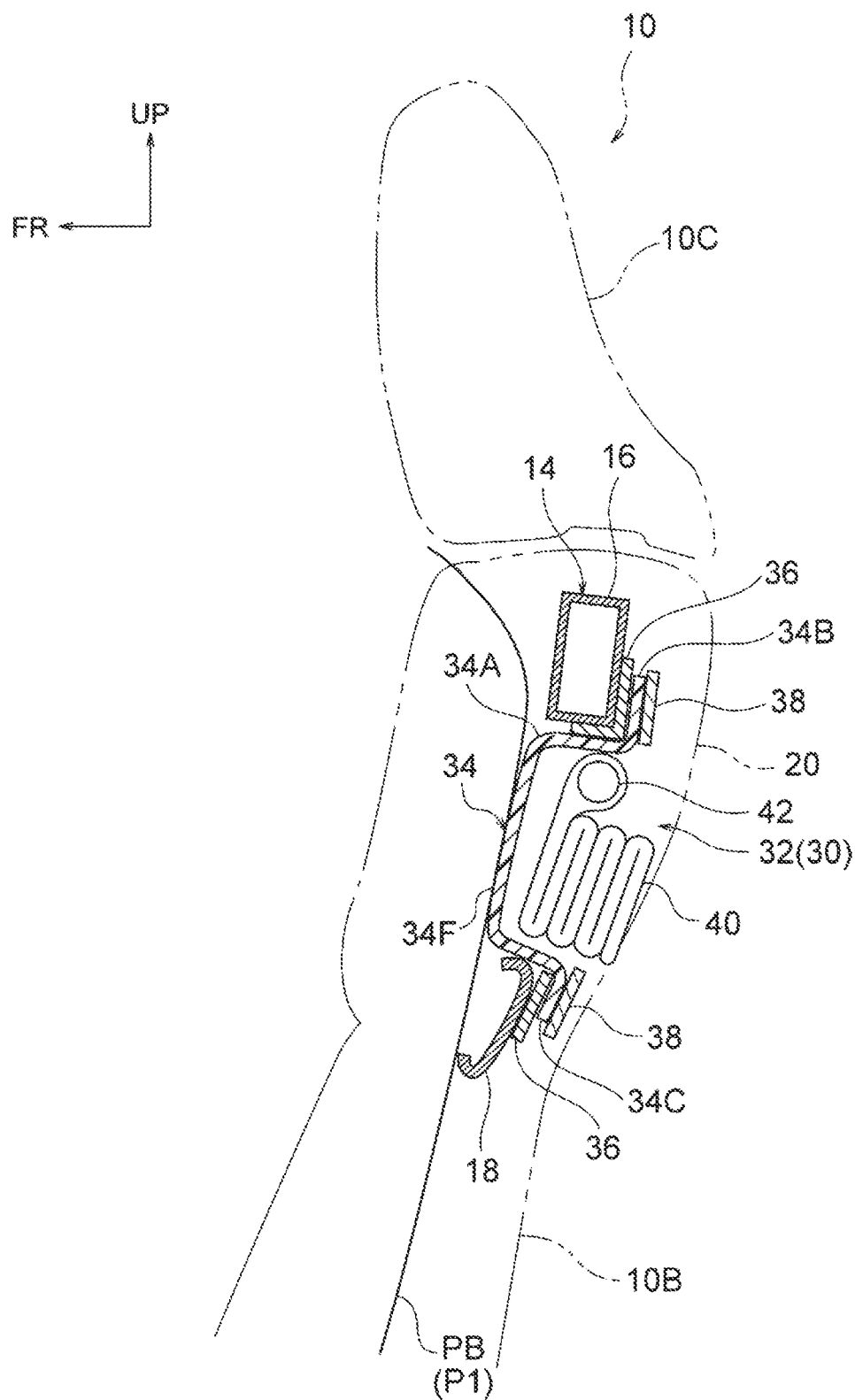
FIG. 3 is a cross-sectional view corresponding to FIG. 2 showing a state in which a module case is deformed to a seat rear side due to an impact of a rear collision of the vehicle.

As shown in FIG. 3, the configuration is such that the module case 34 in which the front portion 34F of the case main body portion 34A is disposed in the back sink-in region is deformed (crushed) to the rear side by the back PB of the front seat occupant P1 that sinks in the seat back 10B due to the impact of the rear collision. In this case, the configuration is such that the module case 34 made of cloth is flexibly deformed so that the back PB is not hindered from sinking in the seat back 10B. Further, when the module case 34 is deformed as described above, the airbag 40 in the module case 34 is displaced to the rear side with respect to the seat back 10B. At this time, for example, the skin 20 of the seat back 10B is elastically deformed to the rear side due to the displacement of the airbag 40. The configuration is such that when the impact of the rear collision is softened, the airbag 40 returns to the original position due to the elastic recovery force of the skin 20, and the module case 34 returns to the original shape.

Operations and Effects

Next, operations and effects of the present embodiment will be described.

In the present embodiment, the rear seat airbag module 32 attached to the frame 14 of the seat back 10B of the front seat 10 has the airbag 40 and the inflator 42 that supplies gas for expansion and deployment into the airbag 40. The rear seat airbag module 32 expands and deploys the airbag 40 to the rear side of the seat back 10B at the time of the frontal collision of the vehicle. As a result, the rear seat occupant P2 seated on the rear seat 12 can be protected by the airbag 40.

Further, the back PB of the front seat occupant P1 seated on the front seat 10 sinks in the seat back 10B due to the impact of the rear collision of the vehicle, and the rear seat airbag module 32 is pressed by the back PB to be deformed to the rear side. As a result, since the above-mentioned sink-in can be suppressed from being hindered by interference with the rear seat airbag module 32, it is possible to ensure a performance of preventing whiplash of the neck of the front seat occupant P1. Moreover, in order to allow the above-mentioned sink-in, it is not necessary to arrange the rear seat airbag module 32 away from the front seat occupant P1 to the rear side. As a result, the seat back 10B can be made thinner in the front-rear direction while the above-mentioned whiplash prevention performance is ensured.

Figure 4:
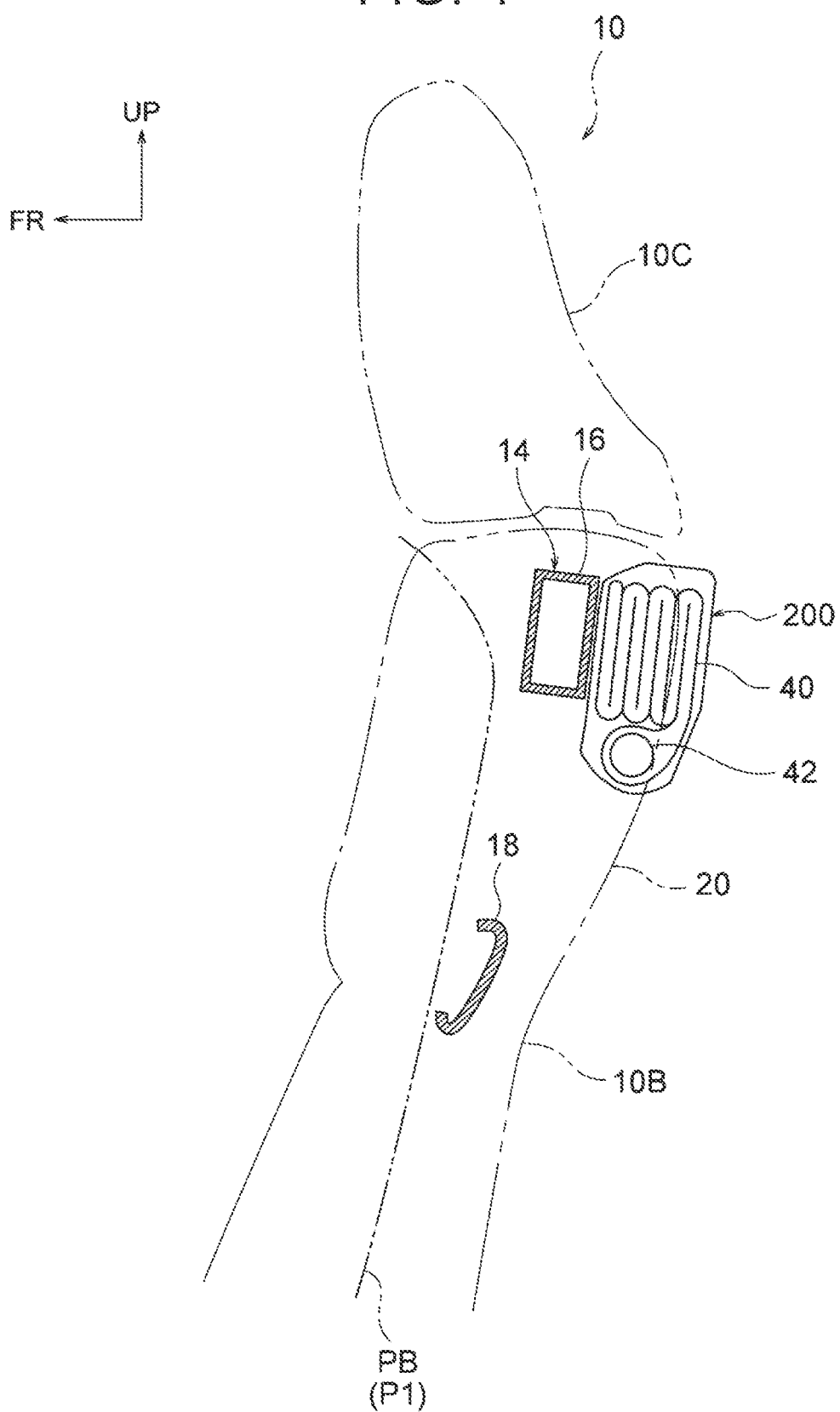
FIG. 4 is a cross-sectional view corresponding to FIG. 2 showing a configuration around the rear seat airbag module in the vehicle seat according to a comparative example, as viewed from the left side of the vehicle.

That is, for example, if a rear seat airbag module 200 is disposed on the rear side of the upper frame portion 16 as in a comparative example shown in FIG. 4, the back PB that sinks in the seat back 10B at the event of a rear collision no longer interferes with the rear seat airbag module 200. However, in order to cover the rear seat airbag module 200 disposed on the rear side of the upper frame portion 16 with the skin 20, the upper back surface (design surface) of the seat back 10B must be set to the rear side. As a result, the seat back 10B becomes thicker in the front-rear direction, and the living space of the rear seat occupant P2 becomes smaller. In this respect, in the present embodiment, since the disposing area of the rear seat airbag module 32 in a normal state and the back sink-in region of the front seat occupant P1 in the case of a rear collision can be set to be partially overlapped, the problem of the comparative example can be solved.

Moreover, in the rear seat airbag module 32, since the airbag 40 is stored in the module case 34, the module case 34 can satisfactorily receive a deploying reaction force when the airbag 40 is expanded and deployed. As a result, the deployment performance of the airbag 40 can be satisfactorily ensured.

Further, in the present embodiment, the airbag module 32 is made of cloth. In this module case 34, the upper and lower flange portions 34B and 34C that are rear side parts are fixed to the frame 14 on both sides in the up-down direction. The case main body portion 34A of the module case 34 is pressed by the back PB of the front seat occupant P1 and is deformed to the rear side at the event of a rear collision of the vehicle. In contrast, when the airbag 40 is expanded and deployed, the cloth module case 34 receives the deploying reaction force of the airbag 40 while receiving a tensile force. By having the module case 34 be made of cloth in this way, it is possible to reduce the weight of the module case 34 as compared with the case in which the module case 34 is made of metal. Moreover, by using a cloth material that is difficult to be stretched as the material of the module case 34, it is possible to satisfactorily receive the deploying reaction force of the airbag 40.

Further, in the present embodiment, the pair of upper and lower flange portions 34B and 34C formed at the rear end portion of the cloth module case 34 is sandwiched by a pair of front-rear retainers 36 and 38 from both sides in the front-rear direction. Then, using the pair of retainers 36 and 38, the cloth module case 34 is fixed to the frame 14 of the seat back 10B. As a result, the cloth module case 34 can be easily and firmly fixed to the frame 14 of the seat back 10B.

Next, other embodiments of the present disclosure will be described. The configurations and operations that are basically the same as those of the first embodiment are indicated by the same reference signs as those of the first embodiment, and the description thereof will be omitted.

Second Embodiment

Figure 5:
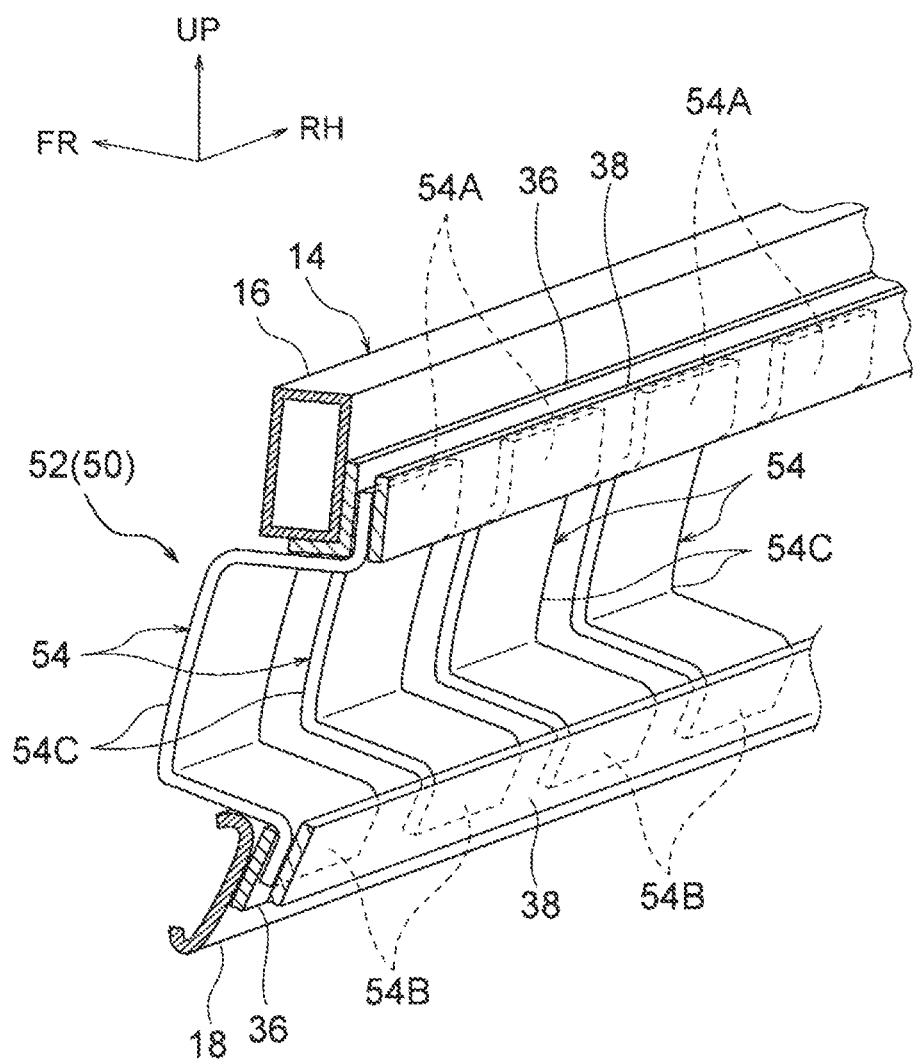
FIG. 5 is a perspective view showing a configuration around the rear seat airbag module in the vehicle seat according to the second embodiment.

FIG. 5 is a perspective view showing the configuration around a rear seat airbag module 50 in the vehicle seat according to the second embodiment of the present disclosure. In the rear seat airbag module 50, a module case 52 is composed of a plurality of straps 54. These straps 54 correspond to a "strip-shaped member" in the present disclosure, and each strap 54 is made of cloth. The cloth material configuring each strap 54 is, for example, the same as the cloth material of the module case 34 according to the first embodiment. These straps 54 correspond to the "easily deformable configuration" in the present disclosure.

The straps 54 are disposed alongside each other in the right-left direction, and both end portions 54A and 54B in the up-down direction, which are both end portions in the longitudinal direction, are fixed to the frame 14. Specifically, the upper end portion 54A of each strap 54 is fixed to the back surface of the upper frame portion 16 in a state in which the upper end portion 54A is sandwiched between the front-rear retainers 36 and 38, and the lower end portion 54B of each strap 54 is fixed to the back surface of the intermediate frame portion 18 in a state in which the lower end portion 54B is sandwiched between the front-rear retainers 36 and 38. A up-down direction intermediate portion 54C of each strap 54 is in a state of being loosened (bent) forward at a height between the upper frame portion 16 and the intermediate frame portion 18, and is protruded to the front side more than the upper frame portion 16 and the intermediate frame portion 18. The airbag 40 and the inflator 42 (not shown) are stored on the rear side of each strap 54 with respect to the up-down direction intermediate portion 54C and between the upper frame portion 16 and the intermediate frame portion 18. The inflator 42 is fixed to, for example, two of the plurality of straps 54 in the same manner as in the first embodiment.

In this embodiment, the configurations other than the above are the same as those in the first embodiment. In this embodiment, when a rear collision of the vehicle occurs, the back PB of the front seat occupant P1 sinks in the seat back 10B due to the impact of the rear collision of the vehicle and thus, the plurality of straps 54 is pressed by the back PB of the front seat occupant P1 to be deformed to the rear side. As a result, since the above-mentioned sink-in can be prevented from being hindered by interference with the rear seat airbag module 32, basically the same effect as that of the first embodiment can be obtained. Further, when the airbag 40 is expanded and deployed, the plurality of straps 54 receives the deploying reaction force of the airbag 40 while receiving a tensile force. As described above, by using the plurality of straps 54, the configuration of the module case 52 can be simplified and the weight can be further reduced.

Third Embodiment

Figure 6:
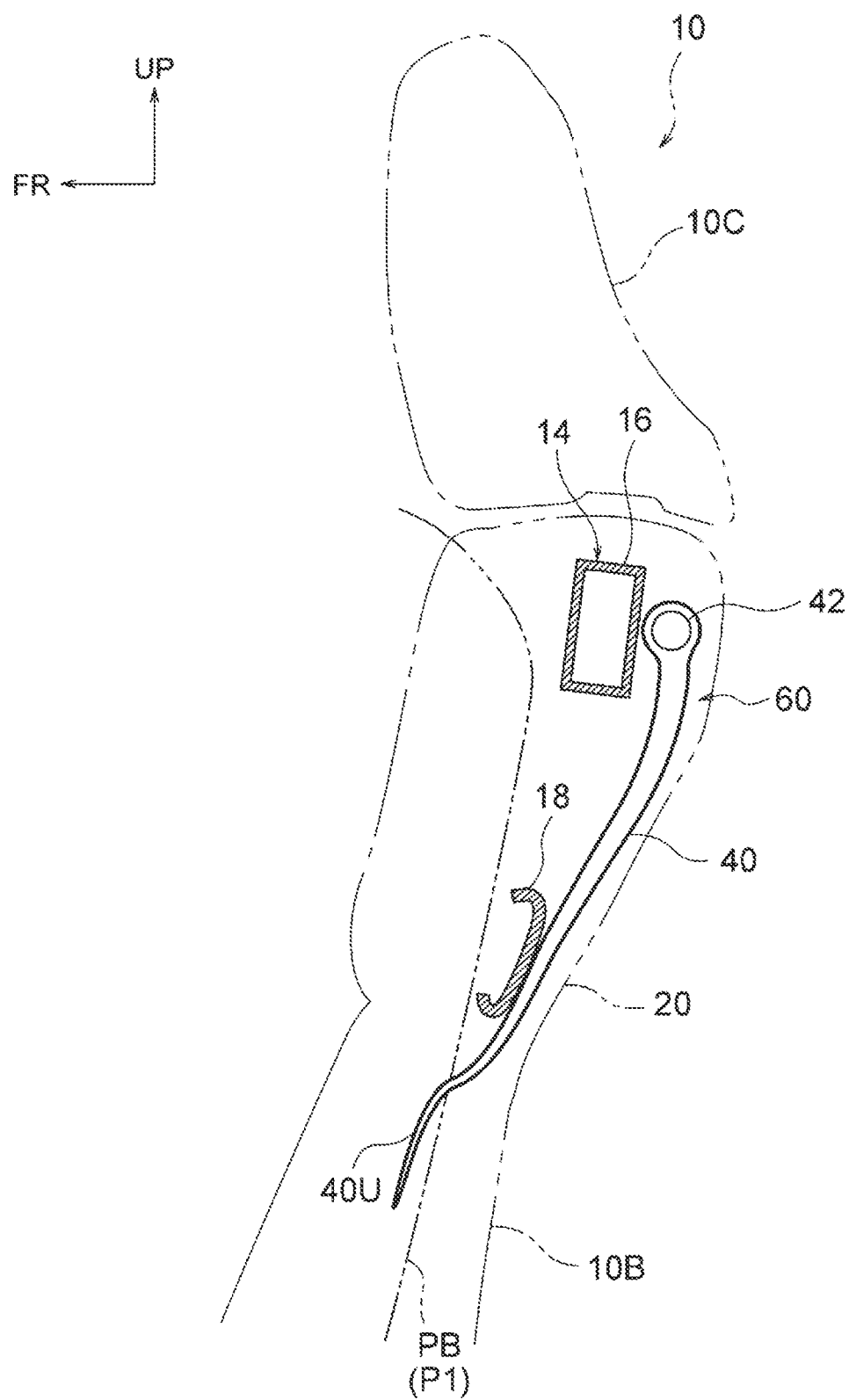
FIG. 6 is a cross-sectional view showing a configuration around the rear seat airbag module in the vehicle seat according to the third embodiment, as viewed from the left side of the vehicle.

FIG. 6 is a cross-sectional view showing the configuration around a rear seat airbag module 60 in the vehicle seat according to a third embodiment of the present disclosure as viewed from the vehicle left side. The rear seat airbag module 60 is not provided with a module case, and while a lower end portion 40U of the airbag 40 is disposed at a position at which the lower end portion 40U is pressed by the back PB at the event of a rear collision, the inflator 42 is disposed at a position at which the inflator 42 is not pressed by the back PB. Specifically, the inflator 42 is disposed behind the upper frame portion 16 and is fixed to the upper frame portion 16 by using stud bolts (not shown). For example, the airbag 40 is not folded and is disposed so as to be extended from the inflator 42 to the seat lower side. The lower end portion 40U of the airbag 40 is disposed in the back sink-in region in which the back PB of the front seat occupant P1 sinks in the seat back 10B at the event of a rear collision of the vehicle, that is, the region on the front side of the long dashed double short dashed line indicating the back PB in FIG. 6.

In this embodiment, the configurations other than the above are the same as those in the first embodiment. In this embodiment, when the back PB of the front seat occupant P1 sinks in the seat back 10B due to the impact of the rear collision of the vehicle, only the lower end portion 40U of the airbag 40 among the airbag 40 and the inflator 42 is pressed by the back described above and is displaced to the rear side. The inflator is disposed at a position at which the inflator is not pressed by the back, that is, a position at which the inflator does not hinder the sink-in of the back PB into the seat back 10B, and is fixed to the frame 14 of the seat back 10B. As a result, the above-mentioned sink-in can be allowed with an extremely simple configuration. Moreover, in this embodiment, since the inflator 42 is disposed behind the upper frame portion 16, it is easy to secure the disposition space of the inflator 42. Further, the deploying reaction force of the airbag 40 can be received by the upper frame portion 16.

Figure 7:
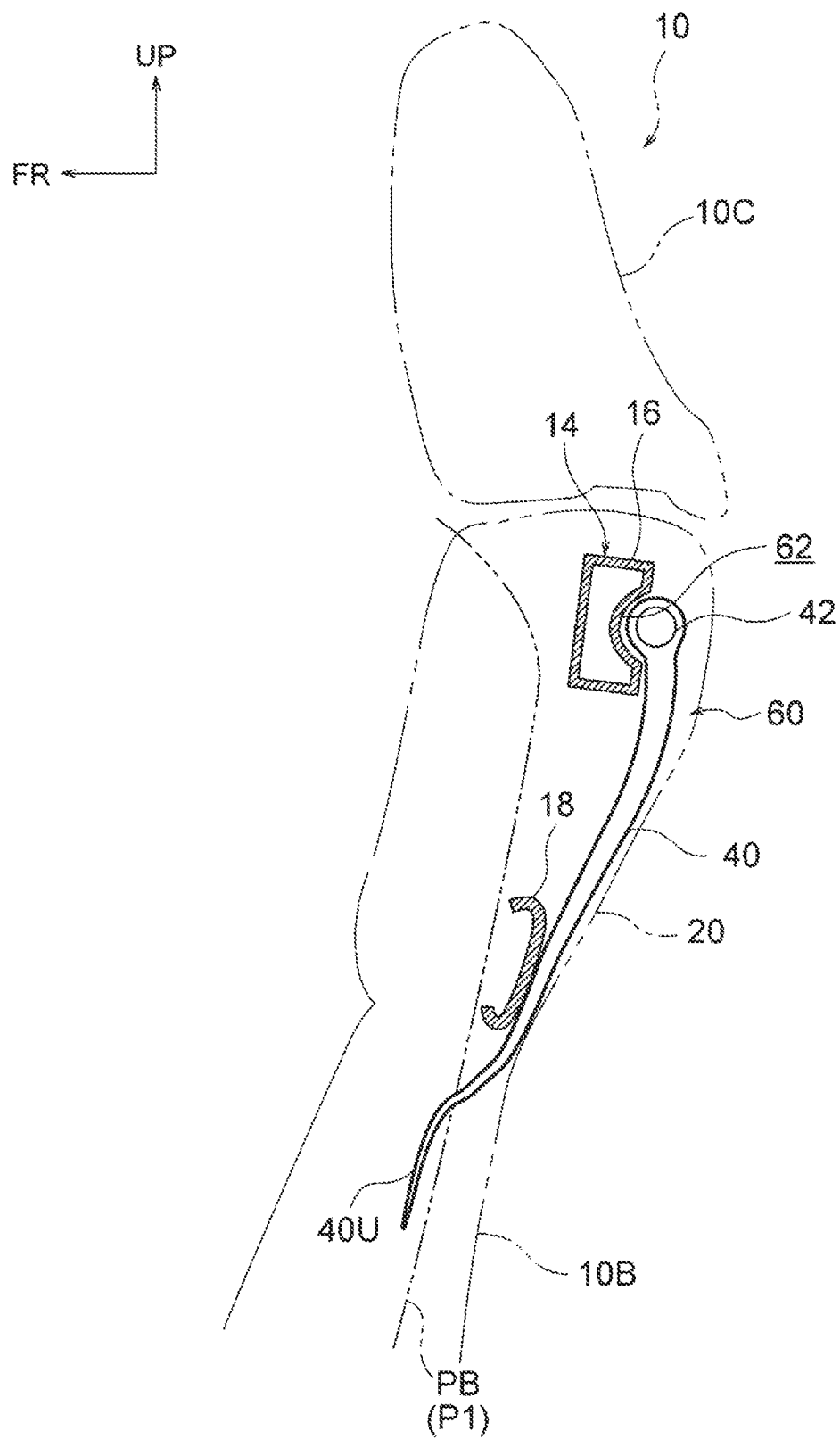
FIG. 7 is a cross-sectional view showing a configuration around the rear seat airbag module in the vehicle seat according to a modified example of the third embodiment, as viewed from the left side of the vehicle.

In addition, in the third embodiment described above, the disclosure may be configured as in the modification shown in FIG. 7. In this modification, a recess portion 62 recessed to the front side is formed on the rear surface of the upper frame portion 16, and at least a part (here, a part) of the inflator is disposed in the recess portion 62. As a result, the protruding amount of the inflator to the rear side of the upper frame portion 16 can be reduced, which further contributes to reducing the width of the seat back 10B in the front-rear direction. The portion at which the recess portion 62 is formed may be the lower surface of the upper frame portion 16.

Fourth Embodiment

Figure 8:
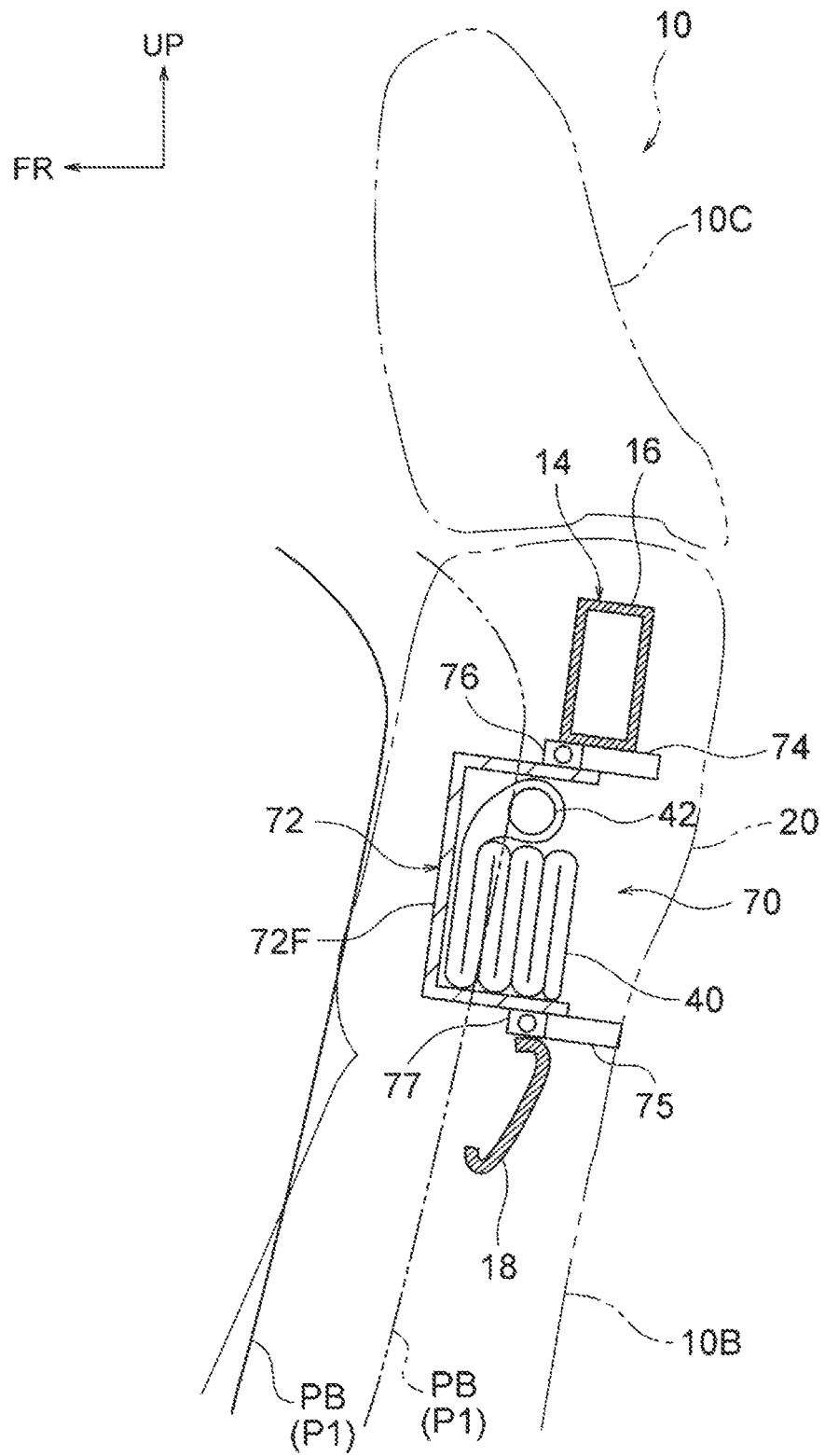
FIG. 8 is a cross-sectional view showing a configuration around the rear seat airbag module in the vehicle seat according to a fourth embodiment, as viewed from the left side of the vehicle.

FIG. 8 is a cross-sectional view showing the configuration around a rear seat airbag module 70 in the vehicle seat according to a fourth embodiment of the present disclosure as viewed from the vehicle left side. In a rear seat airbag module 70, a module case 72 is made of metal, for example. The module case 72 has a box shape with the rear side open, and is disposed at a height between the upper frame portion 16 and the intermediate frame portion 18. An upper slide rail 74 is fixed to the lower end of the upper frame portion 16, and a lower slide rail 75 is fixed to the upper end of the intermediate frame portion 18. For example, each of the upper and lower slide rails 74 and 75 includes a pair of right and left rails disposed in parallel at intervals in the right-left direction, and each rail has a long shape in which a longitudinal direction is the front-rear direction.

Figure 9:
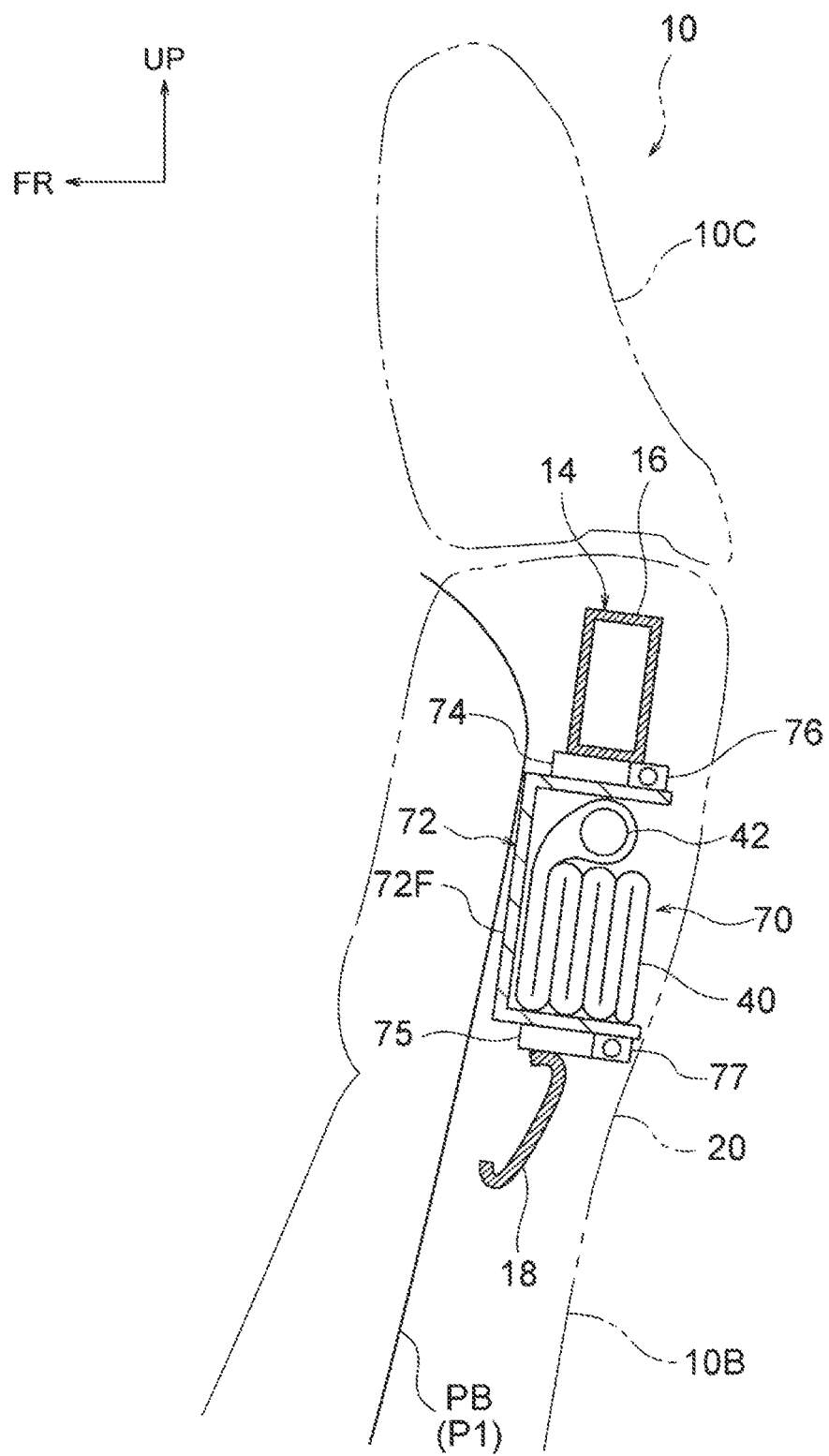
FIG. 9 is a cross-sectional view corresponding to FIG. 8 showing a state in which the module case is displaced to the seat rear side due to an impact of a rear collision of the vehicle.

A pair of right and left upper sliders 76 supported so as to be slidable in the front-rear direction with respect to each rail of the upper slide rail 74 is attached to the upper end of the module case 72. A pair of right and left lower sliders 77 supported so as to be slidable in the front-rear direction with respect to each rail of the lower slide rail 75 is attached to the lower end of the module case 72. As a result, the module case 72 is supported so as to be slidable (displaceable) in the front-rear direction with respect to the frame 14. The module case 72 is normally disposed at the front most position shown in FIG. 8. In this state, a front portion 72F of the module case 72 is disposed in the back sink-in region of the front seat occupant P1 (the region on the front side of the long dashed double short dashed line indicating the back PB in FIG. 8). For example, a shear pin (not shown) provided on at least one of the upper and lower slide rails 74 and 75 engages with at least one of the upper and lower sliders 76 and 77, so that the module case 72 is held at the front most position. When the module case 72 is pressed from the front side by a pressing force of a predetermined value or more, the shear pin is broken and the holding is released. When the holding is released in this way, the module case 72 slides to the rear most position shown in FIG. 9. This rear most position is set to the rear side of the back sink-in region of the front seat occupant P1.

In this embodiment, the configurations other than the above are the same as those in the first embodiment. In this embodiment, when the back PB of the front seat occupant P1 sinks in the seat back 10B due to the impact of the rear collision of the vehicle, a pressing force of the above-mentioned predetermined value or more acts on the module case 72 from the front side. As a result, the shear pin breaks and the module case 72 slides to the rear most position. As a result, since the above-mentioned sink-in can be prevented from being hindered by interference with the rear seat airbag module 70, basically the same effect as that of the first embodiment can be obtained. Moreover, in this embodiment, since the configuration is such that the module case 72 is slidably (displaceably) attached to the frame 14 of the seat back 10B, the disclosure can be configured by using, for example, a conventional metal module case. Further, since the deploying reaction force of the airbag 40 can be received by the metal module case 72 as in the conventional case, it becomes easy to control the deployment direction of the airbag 40. Further, in the present embodiment, since the configuration is such that the module case 72 slides with respect to the frame 14, the above-mentioned sink-in can be allowed while maintaining the posture of the module case 72 with respect to the frame 14.

In the fourth embodiment described above, the configuration may be such that an urging member (for example, a tension coil spring, a compression coil spring, etc.) that urges the module case 72 to the front most position (that is, the front side) is bridged between the module case 72 and the frame 14. As a result, since the module case 72 can be automatically returned to the front most position (that is, the original position) after the rear collision of the vehicle, repairs for returning the module case 72 to the original position become unnecessary. Further, by providing the above-mentioned urging member, the above-mentioned shear pin can be omitted. Further, in the fourth embodiment described above, the module case 72 is not limited to being made of metal, and may be made of a resin. This point is the same in the fifth to seventh embodiments described later.

Fifth Embodiment

Figure 10:
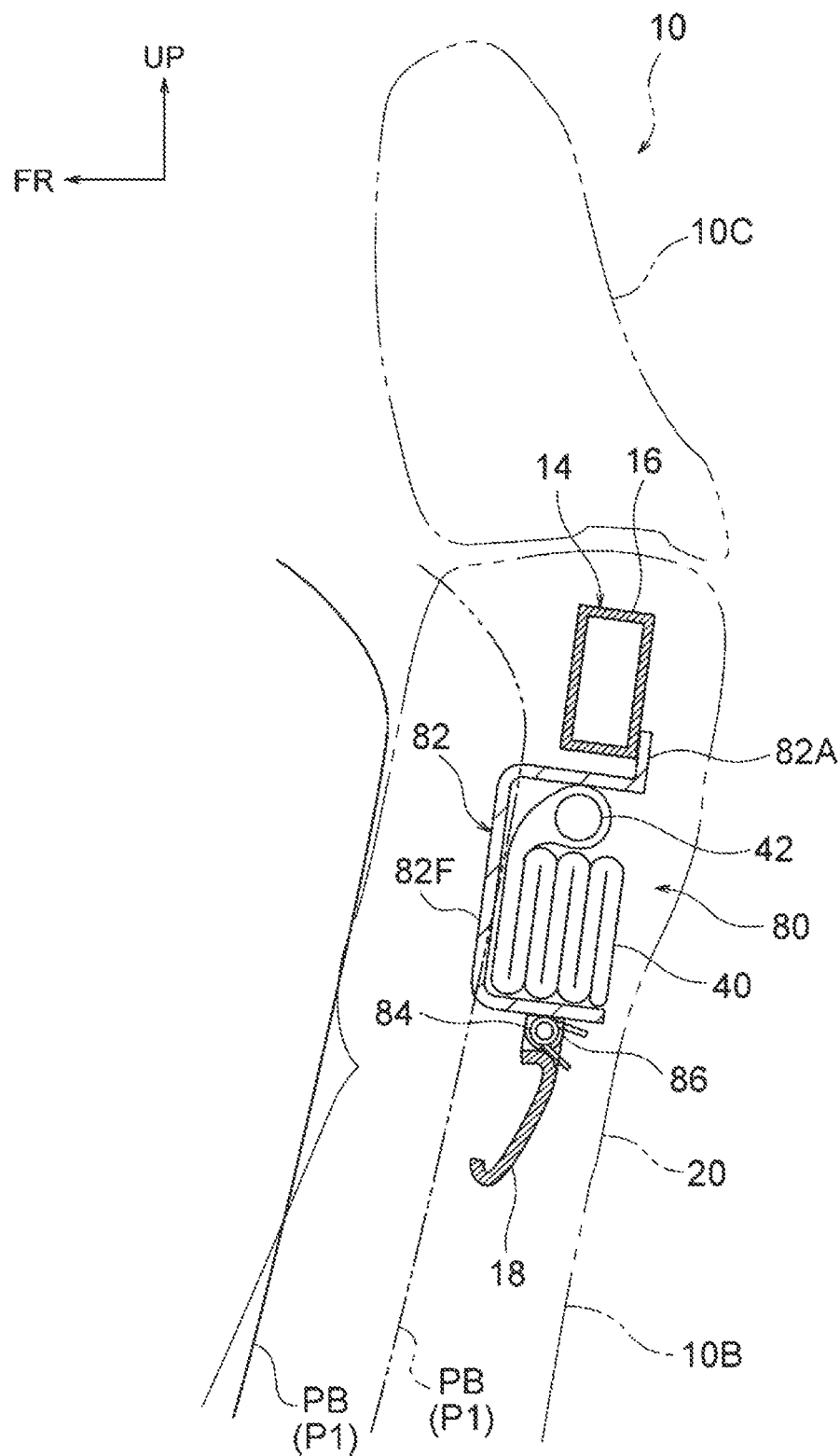
FIG. 10 is a cross-sectional view showing a configuration around the rear seat airbag module in the vehicle seat according to a fifth embodiment, as viewed from the left side of the vehicle.

FIG. 10 is a cross-sectional view showing the configuration around the rear seat airbag module 80 in the vehicle seat according to the fifth embodiment of the present disclosure as viewed from the vehicle left side. In the rear seat airbag module 80, a module case 82 is made of metal, for example. The module case 82 has a box shape with the rear side open, and is disposed at a height between the upper frame portion 16 and the intermediate frame portion 18. The lower end of the module case 82 is coupled to the upper end of the intermediate frame portion 18 via a support shaft 84. The support shaft 84 is disposed with the right-left direction as an axial direction, and the module case 82 is supported by the intermediate frame portion 18 so as to be rotatable and movable around the support shaft 84.

Figure 11:
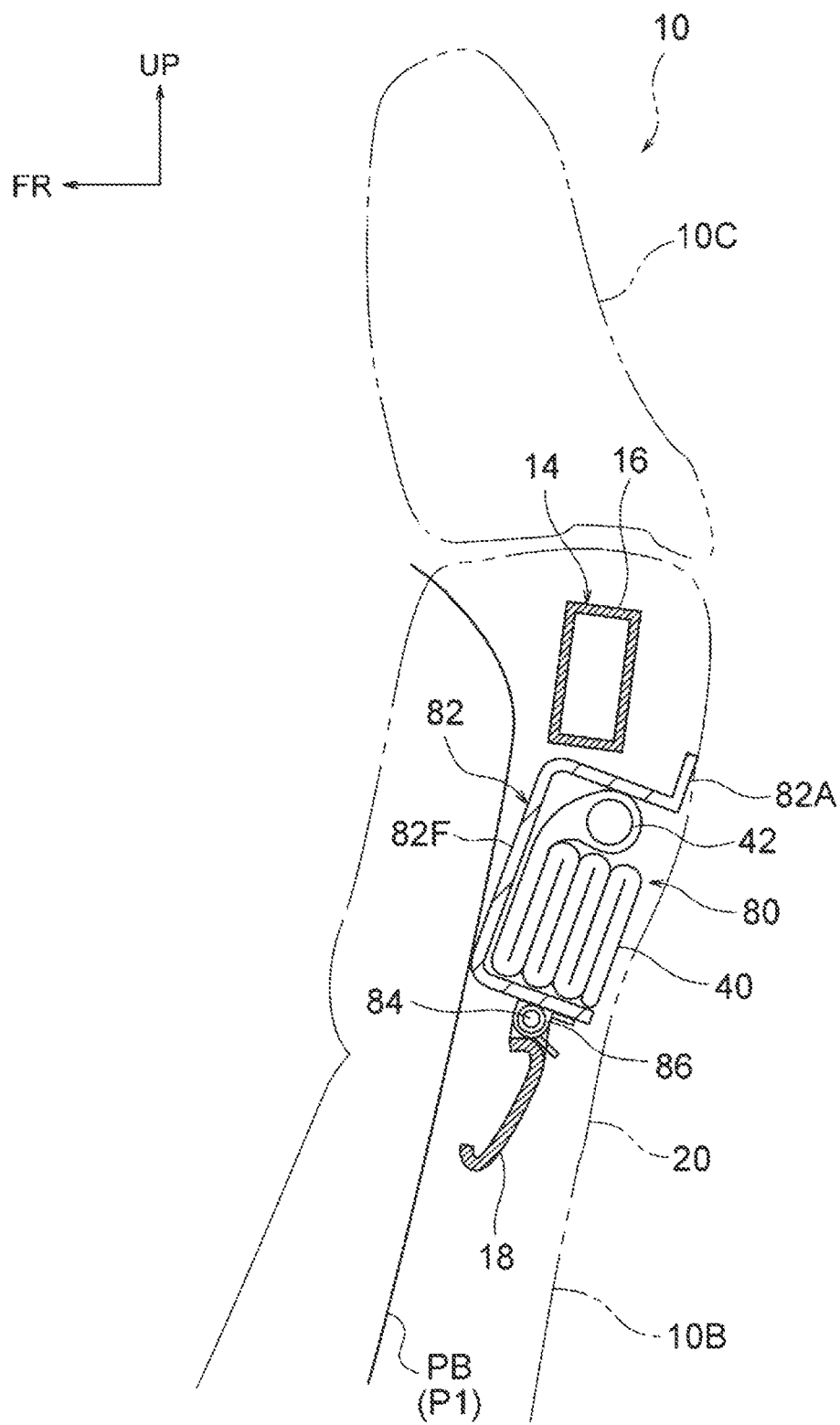
FIG. 11 is a cross-sectional view corresponding to FIG. 10 showing a state in which the module case is displaced to the seat rear side due to an impact of a rear collision of the vehicle.

A stopper portion 82A protruding to the seat upper side is formed at a rear end portion of an upper end portion of the module case 82. The stopper portion 82A is in contact with the back surface of the upper frame portion 16 from the rear side. Further, a torsion coil spring 86, which is an urging member for urging the module case 82 in one direction around the support shaft 84 (counterclockwise direction in FIG. 10), is attached to the support shaft 84. As a result, the module case 82 is urged to the front side, and is normally held in a state in which the stopper portion 82A is in contact with the back surface of the upper frame portion 16 (the state shown in FIG. 10). In this state, a front portion 82F of the module case 82 is disposed in the back sink-in region of the front seat occupant P1 (that is, the region on the front side of the long dashed double short dashed line indicating the back PB in FIG. 8). When the module case 82 is pressed to the rear side against the urging force of the torsion coil spring 86, the module case 82 is rotated and moved (is displaced) to the rear side around the support shaft 84. The configuration is such that the module case 82 is disposed on the rear side of the back sink-in region of the front seat occupant P1 due to the above rotation and movement (see FIG. 11).

In this embodiment, the configurations other than the above are the same as those in the first embodiment. In this embodiment, when the back PB of the front seat occupant P1 sinks in the seat back 10B due to the impact of the rear collision of the vehicle, a pressing force on the rear side acts on the module case 82. As a result, the module case 82 is rotated and moved (is displaced) to the rear side around the support shaft 84. As a result, since the above-mentioned sink-in can be prevented from being hindered by interference with the rear seat airbag module 80, basically the same effect as that of the first embodiment can be obtained. Moreover, in this embodiment, since the configuration is such that the module case 82 is rotatably and movably (displaceably) attached to the frame 14 of the seat back 10B, the disclosure can be configured by using, for example, a conventional metal module case. Further, since the deploying reaction force of the airbag 40 can be received by the metal module case 82 as in the conventional case, it becomes easy to control the deployment direction of the airbag 40. Further, in the present embodiment, since the configuration is such that the module case 82 is rotated and moved with respect to the frame 14, the attachment configuration of the module case 82 with respect to the frame 14 is simplified, compared with the configuration in which the module case 72 slides as in the fourth embodiment. Further, in this embodiment, the module case 82 displaced to the rear side as described above returns to the original position due to the urging force of the torsion coil spring 86. This eliminates the need for repairs to return the module case 82 to its original position.

In this embodiment, the configuration is such that the module case 82 is rotatably supported with respect to the intermediate frame portion 18. However, the present disclosure is not limited to this, and the module case 82 may be rotatably and movably supported with respect to the upper frame portion 16. Further, the urging member is not limited to the above-mentioned torsion coil spring 86, and may be another type of spring or the like.

Sixth Embodiment

Figure 12:
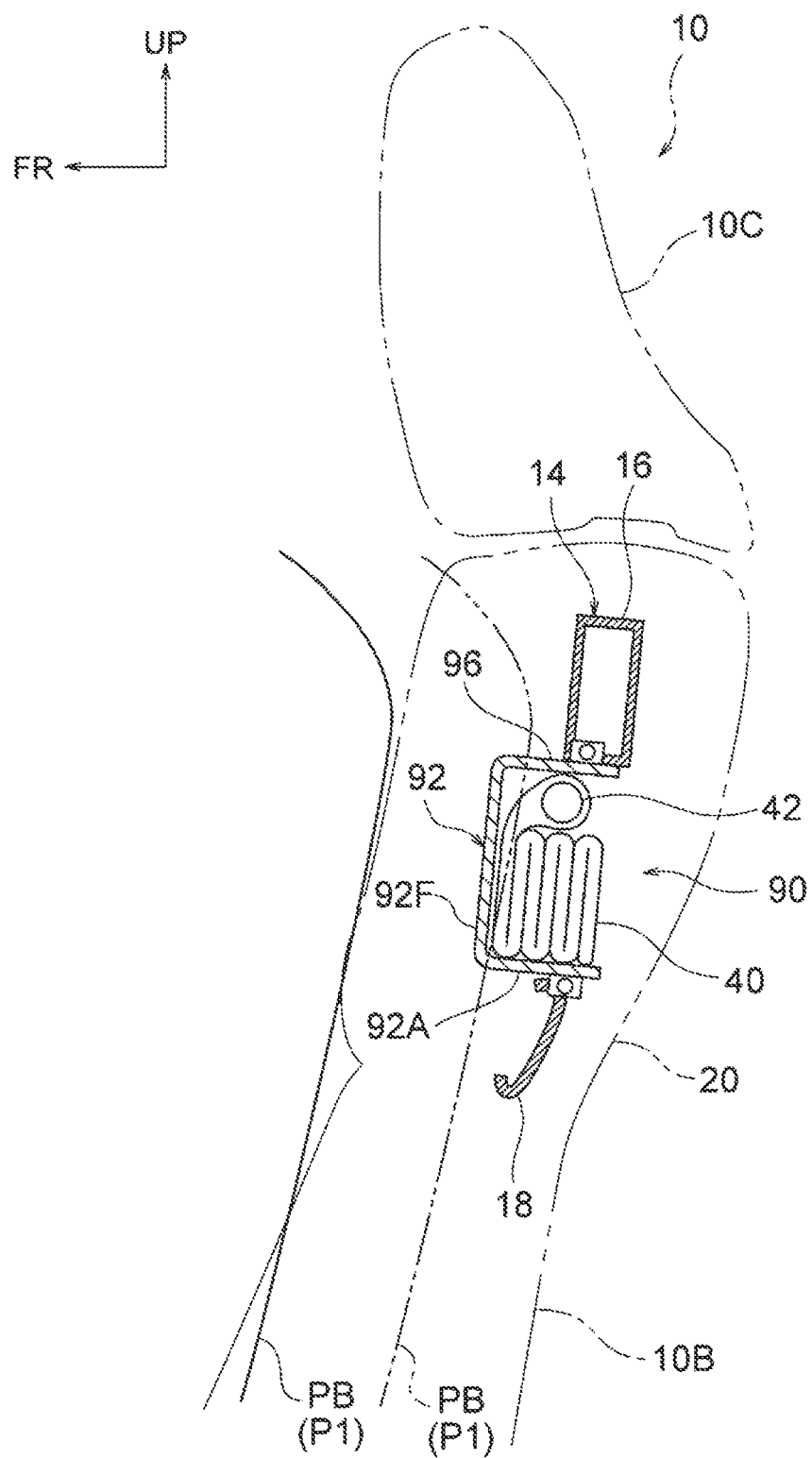
FIG. 12 is a cross-sectional view showing a configuration around the rear seat airbag module in the vehicle seat according to a sixth embodiment, as viewed from the left side of the vehicle.

FIG. 12 is a cross-sectional view showing the configuration around a rear seat airbag module 90 in the vehicle seat according to the sixth embodiment of the present disclosure as viewed from the vehicle left side. In the rear seat airbag module 90, a module case 92 is made of metal, for example. The module case 92 has a box shape with the rear side open, and is disposed at a height between the upper frame portion 16 and the intermediate frame portion 18. The module case 92 is fixed to the upper frame portion 16 and the intermediate frame portion 18 by bolt fastening. A front portion 92F of the module case 92 is disposed in the back sink-in region of the front seat occupant P1 (that is, the region on the front side of the long dashed double short dashed line indicating the back PB in FIG. 12).

Figure 13:
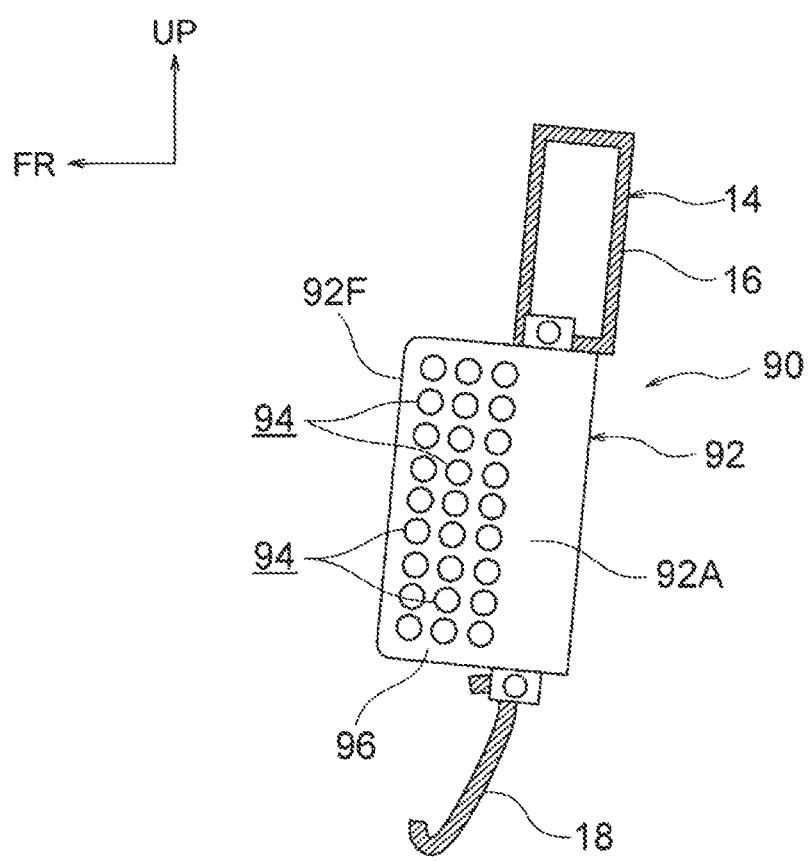
FIG. 13 is a cross-sectional view showing a configuration of the vicinity including the module case of the rear seat airbag module according to the sixth embodiment.
Figure 14:
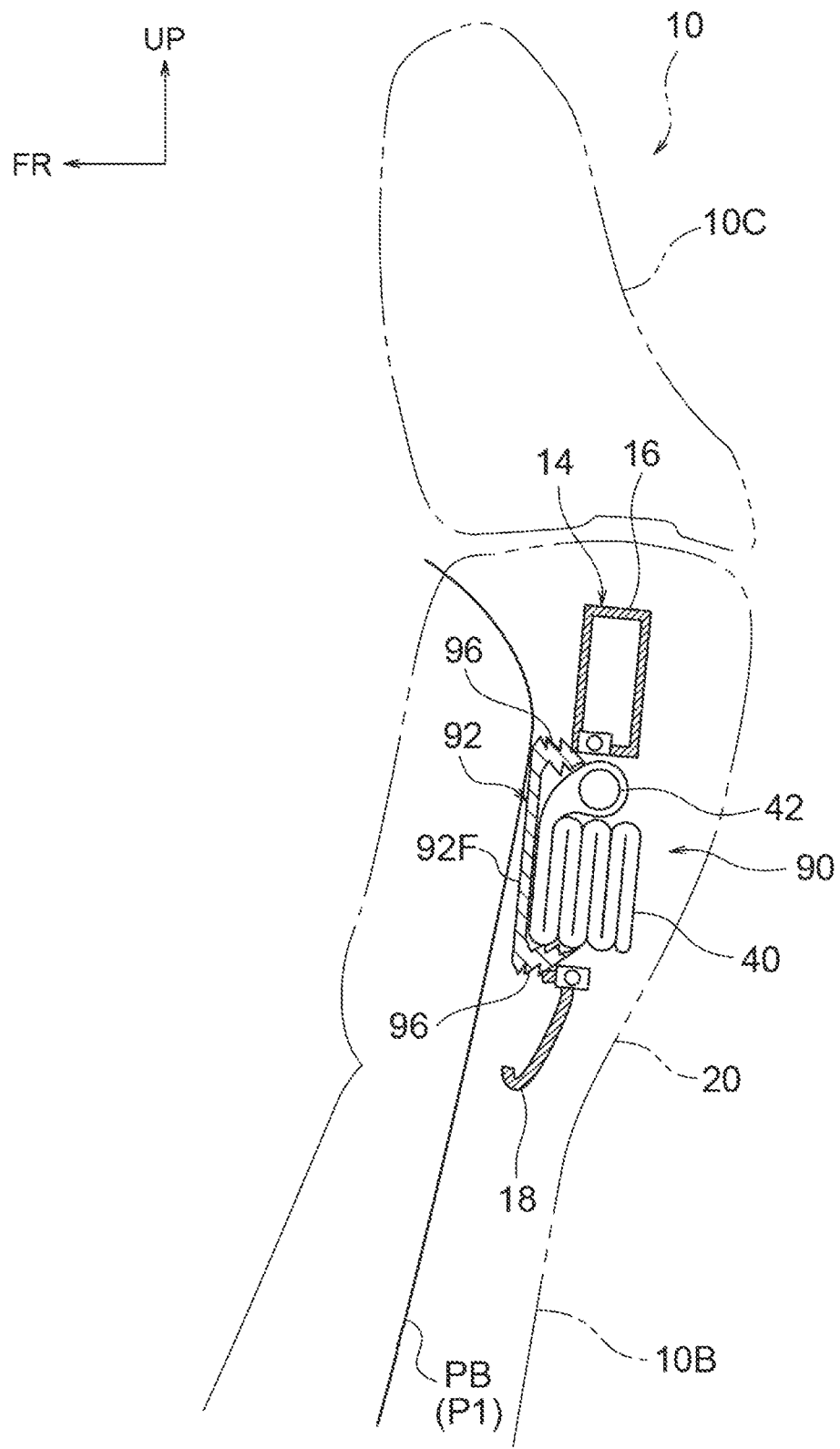
FIG. 14 is a cross-sectional view corresponding to FIG. 12 showing a state in which the module case is deformed to the seat rear side due to an impact of a rear collision of the vehicle.

As shown in FIG. 13, a plurality of holes 94 is formed in a peripheral wall 92A of a module case 92. As a result, a part of the peripheral wall 92A of the module case 92 is regarded as a fragile portion 96. This fragile portion 96 corresponds to an "easily deformable configuration" in the present disclosure. The fragile portion 96 is deformed when the module case 92 is pressed from the front side with a pressing force of a predetermined value or more. The configuration is such that the module case 92 is disposed on the rear side of the back sink-in region of the front seat occupant P1 due to the deformation of the fragile portion 96 (see FIG. 14). The fragile portion 96 is configured to be not deformed by the deploying reaction force of the airbag 40.

In this embodiment, the configurations other than the above are the same as those in the first embodiment. In this embodiment, when the back PB of the front seat occupant P1 sinks in the seat back 10B due to the impact of the rear collision of the vehicle, a pressing force of the predetermined value or more acts on the module case 92 from the front side. As a result, the fragile portion 96 of the module case 92 is deformed to the rear side. As a result, since the above-mentioned sink-in can be prevented from being hindered by interference with the rear seat airbag module 90, basically the same effect as that of the first embodiment can be obtained. Moreover, since the configuration is such that the module case 92 is provided with the fragile portion 96, for example, a conventional metal module case can be diverted without significantly changing the structure. Further, since the deploying reaction force of the airbag 40 can be received by the metal module case 92 as in the conventional case, it becomes easy to control the deployment direction of the airbag 40. Further, in the present embodiment, since the fragile portion 96 is provided in the module case 92 by forming a plurality of holes 94 in the peripheral wall 92A that is a part of the wall of the module case 92, the fragile portion 96 can be simplified.

Figure 15:
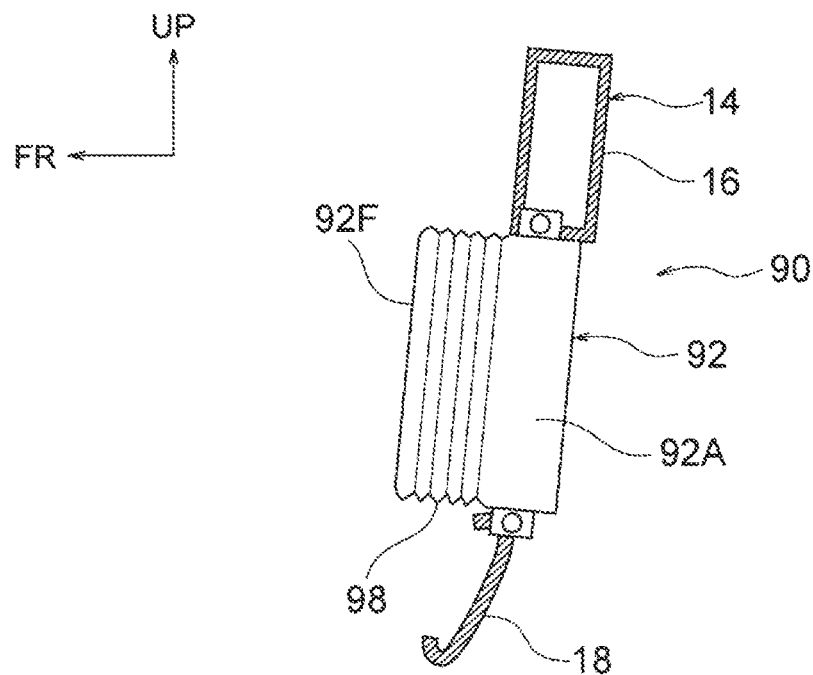
FIG. 15 is a cross-sectional view of a configuration of around the module case of the rear seat airbag module according to a modified example of the sixth embodiment, as viewed from the left side of the vehicle.

In FIG. 13, as an example, the plurality of circular holes 94 is formed in the peripheral wall 92A of the module case 92. However, the shape of each hole is not limited to a circular shape and can be changed appropriately. Further, the fragile portion provided in the module case is not limited to the above-mentioned fragile portion 96, and can be changed appropriately. For example, as in the modified example shown in FIG. 15, a part of the peripheral wall 92A of the module case 92 may be formed in a bellows shape to form a fragile portion 98 (easily deformable configuration). The fragile portion 98 is formed by forming the part of the peripheral wall 92A of the module case 92 in a wave-shaped cross section, and is configured to be easily compressed and deformed to the rear side.

Seventh Embodiment

Figure 16:
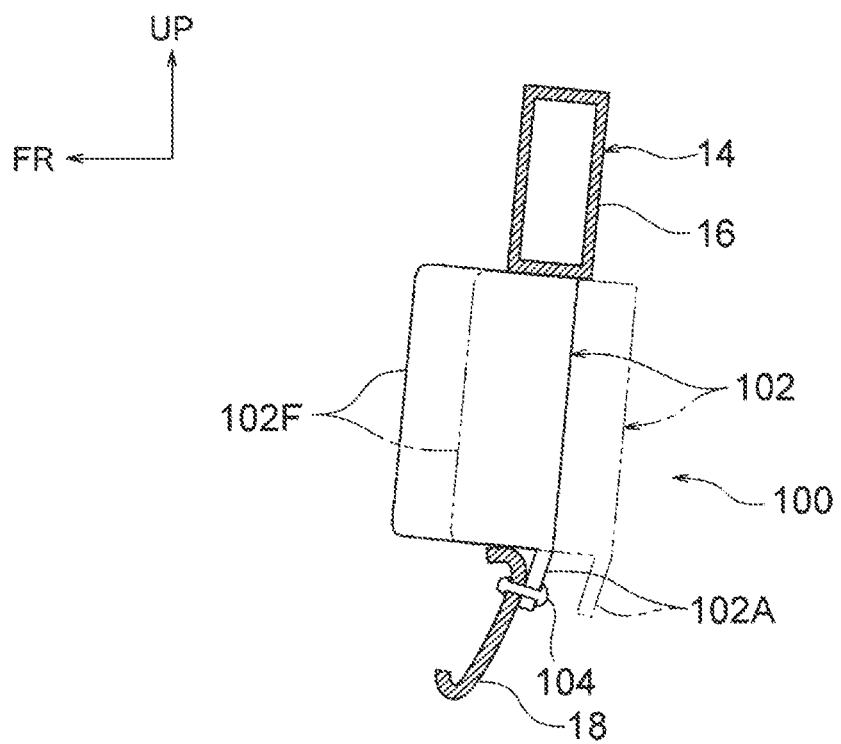
FIG. 16 is a cross-sectional view showing a configuration of around the rear seat airbag module according to a seventh embodiment, as viewed from the left side of the vehicle.

FIG. 16 is a cross-sectional view showing the configuration around a rear seat airbag module 100 in the vehicle seat according to the seventh embodiment of the present disclosure as viewed from the vehicle left side. In the rear seat airbag module 100, a module case 102 is made of metal, for example. The module case 102 has a box shape with the rear side open, and is disposed at a height between the upper frame portion 16 and the intermediate frame portion 18. As an example, the module case 102 is held by the frame 14 by being sandwiched in the up-down direction by the upper frame portion 16 and the intermediate frame portion 18. A front portion 102F of the module case 102 is disposed in the back sink-in region of the front seat occupant P1. A flange portion 102A protruding to the lower side is formed at a rear end portion of a lower end portion of the module case 102. The flange portion 102A is overlapped with the back surface of the intermediate frame portion 18 from the rear side, and is fixed to the intermediate frame portion 18 by using a clip 104. The clip 104 is deformed or broken when the module case 92 is pressed from the front side with a pressing force of a predetermined value or more, and the clip 104 releases the fixing described above. As a result, the module case 102 is configured to be displaceable to the rear side with respect to the frame 14. The clip 104 is configured so as not to be broken by the deploying reaction force of the airbag 40.

In this embodiment, the configurations other than the above are the same as those in the first embodiment. In this embodiment, when the back PB of the front seat occupant P1 sinks in the seat back 10B due to the impact of the rear collision of the vehicle, a pressing force of the predetermined value or more acts on the module case 102 from the front side. As a result, the clip 104 is deformed or broken, the module case 102 is released from being fixed to the intermediate frame portion 18, and the module case 102 is displaced to the rear side with respect to the frame 14. As a result, since the above-mentioned sink-in can be prevented from being hindered by interference with the rear seat airbag module 90, basically the same effect as that of the first embodiment can be obtained. Moreover, in this embodiment, since the configuration is such that the module case 102 is attached to the frame 14 of the seat back so as to be displaceable, the disclosure can be configured by using, for example, a conventional metal module case. As a result, the deploying reaction force of the airbag 40 can be satisfactorily received by the metal module case 92.

In each of the above-described embodiments, the front-rear direction of the front seat 10 that is the vehicle seat coincides with the front-rear direction of the vehicle. However, the present disclosure is not limited to this. That is, the vehicle seat according to the present disclosure may be mounted on a vehicle capable of automatic driving for example, and the front-rear direction with respect to the vehicle can be reversed. However, in that case, when the vehicle has a frontal collision in a state in which the vehicle seat according to the present disclosure faces backward, the back of the occupant sinks in the seat back. Thus, the above-mentioned "frontal collision" corresponds to a "rear collision" in the present disclosure.

Although the present disclosure has been described above with reference to some embodiments, the present disclosure can be implemented with various modifications without changing the gist thereof. Further, it is understood that the technical scope of the present disclosure is not limited to the above-described embodiment.

What is claimed is:

1. A rear seat airbag module comprising:
   an airbag; and
   an inflator configured to supply gas for expansion and deployment into the airbag,
   wherein the rear seat airbag module is attached to a frame of a seat back of a vehicle seat, and is configured to expand and deploy the airbag to a seat rear side of the seat back, and
   wherein the rear seat airbag module is displaceable to the seat rear side or deformable to the seat rear side due to an easily deformable configuration, by being pressed by a back of an occupant seated on the vehicle seat, as a result of the back being sunk in the seat back due to an impact of a rear collision of a vehicle.

2. The rear seat airbag module according to claim 1, further comprising a module case that stores the airbag and that is attached to the frame,
   wherein the module case has an easily deformable configuration so as to be pressed by the back and deformed.

3. The rear seat airbag module according to claim 2, wherein:
   the module case is made of cloth; and
   a part of the module case on the seat rear side is fixed to the frame on both sides in a seat up-down direction.

4. The rear seat airbag module according to claim 3, wherein:
   a pair of upper and lower flange portions extended to both sides in the seat up-down direction is formed at a rear end portion of the module case;
   the pair of upper and lower flange portions is sandwiched by a pair of front-rear retainers from both sides in a seat front-rear direction; and
   the module case is fixed to the frame using the pair of front-rear retainers.

5. The rear seat airbag module according to claim 2, wherein:
   the module case has a plurality of strip-shaped members, each of the strip-shaped members being made of cloth;
   the plurality of strip-shaped members are disposed alongside each other in a seat right-left direction, both end portions of each strip-shaped member in a seat up-down direction are fixed to the frame, and an intermediate portion of each strip-shaped member in the seat up-down direction is loosened toward a seat front side; and
   the airbag is stored on the seat rear side with respect to the intermediate portion of the plurality of strip-shaped members in the seat up-down direction.

6. The rear seat airbag module according to claim 2, wherein the module case has a fragile portion that is plastically deformed by being pressed by the back.

7. The rear seat airbag module according to claim 6, wherein the fragile portion is configured by having a plurality of holes formed in a peripheral wall of the module case.

8. The rear seat airbag module according to claim 1, further comprising a module case for storing the airbag,
   wherein the module case is attached to the frame so as to be displaceable to the seat rear side by being pressed by the back.

9. The rear seat airbag module according to claim 8, further comprising an urging member that urges the module case that is displaced to the seat rear side with respect to the frame to a seat front side.

10. The rear seat airbag module according to claim 8, wherein the module case is attached to the frame so as to be slidable to the seat rear side.

11. The rear seat airbag module according to claim 8, wherein the module case is attached to the frame so as to be rotatable and movable to the seat rear side.

12. The rear seat airbag module according to claim 1, wherein while the airbag is disposed at a position at which the airbag is pressed by the back during the rear collision, the inflator is disposed at a position at which the inflator is not pressed by the back during the rear collision and the inflator is fixed to the frame.

13. The rear seat airbag module according to claim 12, wherein:
   the frame has an upper frame portion extended in a seat right-left direction at an upper end portion in the seat back;
   the inflator is disposed on the seat rear side of the upper frame portion; and
   the airbag is disposed so as to be extended from the inflator to a seat lower side.

14. The rear seat airbag module according to claim 13, wherein:
   a recess portion that is recessed to a seat front side is formed on a surface on the seat rear side of the upper frame portion; and
   at least a part of the inflator is disposed in the recess portion.

15. A vehicle seat comprising:
   a seat cushion;
   a seat back; and
   the rear seat airbag module attached to the frame of the seat back, according to claim 1.

* * * * *